United States Patent [19]

Hultsch et al.

[11] 4,153,551

[45] May 8, 1979

[54] WOBBLE CENTRIFUGE AND METHOD OF OPERATION

[75] Inventors: Günther Hultsch; Helmut Wilkesmann, both of Munich, Fed. Rep. of Germany

[73] Assignee: Krauss-Maffei AG, Munich, Fed. Rep. of Germany

[21] Appl. No.: 884,162

[22] Filed: Mar. 7, 1978

[30] Foreign Application Priority Data

Mar. 11, 1977 [DE] Fed. Rep. of Germany ....... 2710586

[51] Int. Cl.[2] .............................................. B01D 33/02

[52] U.S. Cl. ....................................... 210/78; 210/367

[58] Field of Search ........................... 210/78, 364–367

[56] References Cited

FOREIGN PATENT DOCUMENTS 1072199 12/1959 Fed. Rep. of Germany.

1151223 2/1961 Fed. Rep. of Germany.

1022526 7/1958 Switzerland.

*Primary Examiner*—Frank Sever

*Attorney, Agent, or Firm*—Karl F. Ross

[57] ABSTRACT

A centrifuge has a drum to which a wobble or nutating motion is applied to discharge the centrifuged material over the edge of a wall of the perforated basket. The wobble or nutation is caused by tilting the axis of this wall relative to the axis rotation of the assembly. According to the invention, the basket is rotatably driven by an inner shaft and ride upon an inclined member driven by an outer shaft. The ratio $n_2/n_1$ of the rotating speed $n_1$ of the inner shaft and the rotating speed $n_2$ of the outer shaft can be varied between values of −5 and +7 preferably −5 to +6 excluding values of about 0, 0.9, 1 and 2. The ratio determines the effective nutating angle.

2 Claims, 4 Drawing Figures

WOBBLE CENTRIFUGE AND METHOD OF OPERATION

FIELD OF THE INVENTION

The present invention relates to a filtering centrifuge and method of operation same and, more particularly, to a centrifuge for the separation of solids from liquids, e.g. in the removal of mother liquor from crystals, for the dewatering of sludges and for the recovery of particulates from water or other solids in which they are suspended.

BACKGROUND OF THE INVENTION

Filtering and separation centrifuges for the aforedescribed purposes are known in a variety of configurations and, for the present purposes, only the upwardly-open basket type of filter or separation centrifuge need be considered. In such a centrifuge, a generally upwardly open perforated basket or shell is rotated at relatively high speed about an upright axis to impart centrifugal forces to the liquid ejected through the openings of the basket corresponding to several hundreds to 10.000 or more times the gravitational acceleration, i.e. from say 200 G to upwardly 10,000 G.

Reference may be made to German Pat. Nos. DT-PS 1,072,199, 1,198,295 and 1,288,990, in this connection. These patents deal with wobbling or nutating centrifuges in which the basket is constituted as a frustocone and has a wall of the centrifugation drum which is inclined ultimately at each location at such an angle to the vertical that the centrifugal force is effective to cast the material over an edge of this wall, while over the remaining portion of the drum, the inclination is such as to prevent or limit discharge over this edge.

In other words, the drum receives a wobbling or nutating movement in which the outwardly tilted edge of the drum at any instant permits the discharge of centrifuged material from the drum and induces the transport of the centrifugal material therealong.

The degree of tilt must, of course, be a function of the slip angle of the centrifuged material. The slip angle is defined as that angle with the direction of force which a surface can make in contact with a body bearing against that surface in the direction of the applied force which will enable the body or mass to slip against the retarding friction and hence slide along the surface.

In the case of the upright centrifuge, the applicable force is the centrifugal force which is effective radially and hence the wall of the drum is tilted by the wobbling or nutating action so as to decrease the angle which includes with a radius to permit slip of the centrifuge material along the wall of the drum.

The wobbling or nutating motion of the drum thus causes continuous discharge and movement without requiring an inclination of the drum wall over the entire periphery to correspond to the slip angle. In this respect, the wobbling or nutating centrifuge drum has a considerable advantage over systems in which no nutation or wobbling occurs.

Wobbling and nutating centrifuges are basically provided for the separation of relatively rapidly filtering materials. A disadvantage of such centrifuges, as constructed and designed in accordance with prior-art principles resides however in the fact that transport conditions brought about by the wobbling or nutating movement are dependent upon the sliding or slip characteristics of the centrifuged material, i.e. the coefficient $\mu$.

The various solids to be separated in the wobble or nutating centrifuge have different friction coefficients.

In German Pat. No. DT-PS 1,151,223, there is described a system wherein the nutating or wobble angle $\tau$ (i.e. the angle between the axis of the drum in its greatest-throw position included with the normal axis of vertical) is adjustable.

The apparatus, however, provided with such adjustability is extremely expensive. Furthermore, the high restoring forces which arise in the wobble or nutating centrifuge must be taken up by the bearings of tee wobble-generating head and, where some adjustability is provided, also by the adjustment mechanism. In other wobble or nutating centrifuges of the type described in the art, the angle is fixed and a variety of drums or heads with different angles, depending upon the various materials to be centrifuged must be stocked and used interchangeable in the centrifuge.

OBJECT OF THE INVENTION

It is the principal object of the present invention to provide a wobble or a nutating centrifuge of relatively low cost and high efficiency, and a method of operating same, whereby the disadvantages of the earlier system are to be avoided.

Another object of the invention is to provide a wobble or nutating centrifuge in which the material-transport impulse, produced by the wobbling or eccentric movement and the tilting of the drum, can be varied with relatively simple means and is not susceptible to damage by the throw imparted to the system by the nutating movement.

It is also an object of the invention to provide a centrifuge of the type described and for the purposes stated which has improved, continuously adjustable means for varying the wobble or nutating angle as the latter has been defined above.

It is also an object of the invention to provide a method of operating a system of the type last described which affords the possibility of adjustment even during operation of the centrifuge.

SUMMARY OF THE INVENTION

These objects and other which will become apparent hereinafter are attained, in accordance with the present invention, with a centrifuge of the type, and for the purposes described in the aforementioned publication, which comprises a perforated basket having a generally upright axis and surrounded by a frustoconical shell for discharging the centrifugally displaced liquid, the basket and shell forming a centrifugal drum to which is imparted a wobbling or nutating movement by tilting the axis of the drum relative to the vertical.

The centrifuge has an inner drive shaft which is connected with the drum and is rotatable about a vertical axis while an outer hollow shaft receives the inner or core shaft and is formed with a guide cooperating with the drum to tilt the axis thereof relative to the vertical axis of the coaxial shafts.

According to the invention, both the inner or core and the outer or hollow shafts are rotatable within the centrifuge housing and the relative speeds of these shafts is varied to adjust the throw or effective tilt, wobble or nutation angle.

We have now found that there is a ratio $n_2/n_1$ between the speeds n of the hollow shaft and the speed $n_1$ of the core or inner shaft which, if maintained between values of $-5$ and $+7$, preferably between $-5$ and $+6$, excluding values of substantially 0,0.9, 1 and 2, will afford a wide range of control of the wobble or nutation angle and effective adjustment of the transport process for centrifugal materials of all types.

The ratio $Y=n_2/n_1$ can vary between negative and positive values as described above, negative values corresponding to rotation of the two shafts in opposite centers while positive values correspond to rotation of the two shafts in the same sense. The values of $n_1$ and $n_2$ can be given in revolutions per minute (RPM) and the speed $n_1$ fo the inner shaft can be any speed convenient and commonly used heretofore to generate the necessary centrifugal force for the separation process.

It should be noted that, in the prior art, wherever an inner shaft and an outer or hollow shaft were provided in the context of a centrifuge of the wobble or nutating type and both members were rotated, the difference between angular velocity $n_1$ of the core or inner shaft and the angular velocity $n_2$ of the outer or hollow shaft was held small and consistent. The hollow shaft practically always ran 10% slower than the core or inner shaft. This is described in the aforementioned patents.

The invention, however, is based upon the surprising recognition that the transport impuls E, i.e. the tendency to displace the centrifuged material, can be varied without structural modification of the means affording a tilt of the drum relative to the shaft axis and thus for a given inclination of the surface of the hollow shaft upon which the drum rides. In other words there is an effective change in the wobbling or nutating angle without alteration in the structure which has been considered to provide this angle and which, moreover, can be varied for any product to be subjected to centrifugation.

Put otherwise, a wobble or nutating centrifuge generally has an angular surface connected to the hollow shaft or fixed on the housing and upon which the drum rides, this surface being inclined at a given angle to the axis of the drive shaft or the drum. The drive shaft for the drum can be connected by a cardan or universal joint to the drum itself. As a result, from a structural point of view, i.e. at standstill of the apparatus, the axis of the drum includes with the axis of the shaft a structurally defined angle.

When, however, the system is operated under the conditions of the present invention, the drum includes an effective angle $\tau'$ with the axis of the shaft which can, as practical matter, be varied between 0 and $\tau$ depending upon the aforementioned ratio Y. Consequently, simply by changing the speed difference between the inner shaft and the hollow shafts the effective material-transport nutating, throw or wobble angle $\tau'$ can be adjusted.

We have found, moreover, that, within the aforedescribed range of values of the ratio $Y=n_2/n_1$, there are certain values which can be excluded and in which the transport impulse is reduced to zero or is so small as to preclude effective material transport so that an effective displacement of the material does not occur over the entire drum. For example, between values Y=n/n of about 0 and 2, there is practically no transport impulse at all and a displacement of the centrifugal material across the drum does not occur to a material degree. The values of the ratio $Y=n_2/n_1$ of about 1, the material is found to travel too slowly around the drum.

With values of the speed ratio Y=n/n smaller than 0 and greater than 2, the effective wobble or nutation angle $\tau'$ has a negative value. This means that the position of the slip-generatrix line, by comparison with the value from 0 to 2, is offset by 180° along the periphery of the drum. In this region, the effective wobble or nutating angle can have larger values than the structurally defined angle $\tau$. Consequently, a relatively small centrifuge with a relatively small structurally defined angle $\tau$ can be operated with much greater effective angles $\tau'$.

According to a feature of the present invetion, the centrifuge is operated with values of the ratio $Y=n_2/n_1$ in one of the following ranges:

(a) 0.1 to 0.85,
(b) at 0.95,
(c) 1.05 to 1.0,
(d) 2.1 to 5, or
(e) 0.1 to −3.

According to another feature of the invention the ratio Y is selected such that the effective wobble or nutating angle $\tau'$ is related to the structural angle $\tau$ by the following approximate empirical formula $$\tau' = [1 - (1 - \frac{n_2}{n_1})^2]\,\tau.$$

The adjustment and selection of the desired speed differences and thus selection of the effective wobble or nutating angle $\tau'$ is carried out in a simple manner in accordance with the present invention. There are various systems which may be used for this purpose. For example, where the shafts are belt-driven by the same or separate motors, the speed change can be effected by changing the respective pulleys or one of the pulleys while leaving the other alone. Naturally, the speed-changing transmission can be provided upon the two shafts or between the motor and one or both of these shafts.

In accordance with another aspect of the invention, the speed difference between the inner or core shaft and the outer or hollow shaft is adjustable during operation of the centrifuge. This is preferably achieved by coupling each of the shafts with a respective electric motor, one of the electric motors, preferably that which drives the hollow shaft, being of controllable speed.

This concept permits a fine adjustment of the angle $\tau'$ for a particular centrifuged material during the operation of the centrifuge and can be used to terminate the transport of the material along the drum, if desired, even outside the effective ranges of the ratio Y described previously.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
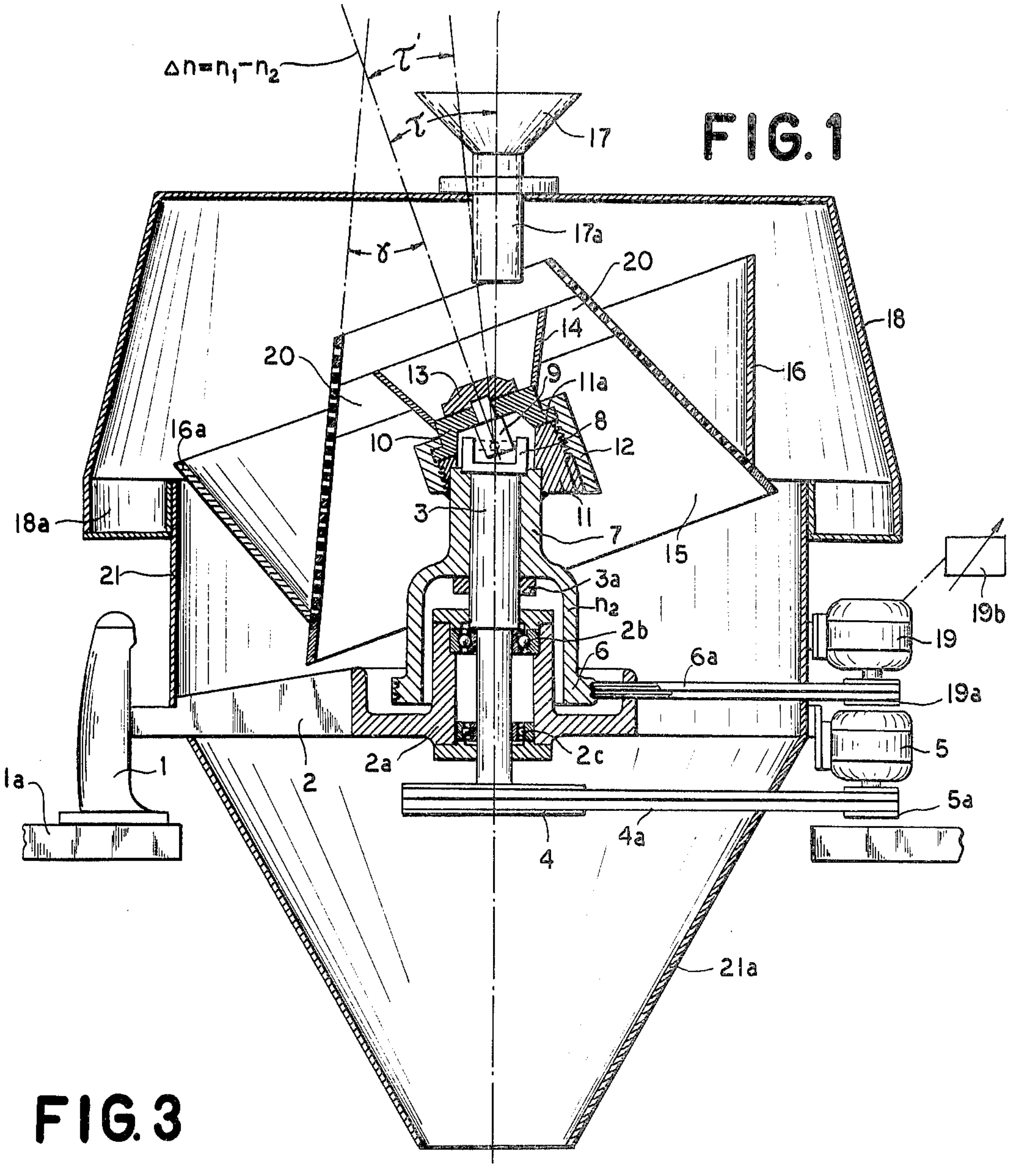
FIG. 1 is a fragmentary axial (vertical) cross-sectional view through a wobble or nutating centrifuge in accordance with the present invention.

In FIG. 1, we have shown a wobble or nutating centrifuge which comprises a plurality of posts 1 (only one shown) which carry the bottom 2 of the centrifuge housing so that the latter is capable of oscillation relative to the support surface 1*a* upon which the posts are mounted. A core or central shaft 3 is provided with a V-belt 4 connected by belts 4*a* to the drive pulleys 5*a* of a motor 5 mounted upon the housing.

At the upper end of the core shaft 3, there is provided a drive member of a universal or cardan joint 8 which entrains the drum shaft 9.

The drum shaft 9 is connected to a slide head 10 by a nut 13, the slide head 10 carrying a collecting or distributing cup 14 of upwardly divergent, open, frustoconical configuration.

Radial ribs 20 support a downwardly divergent frustoconical perforated centrifugal drum 15 upon the distributor 14, the centrifugal drum 15 having a conicity angle $\gamma$.

The slide head 10, in turn, rests upon the inclined plane surface 11*a* of a disk 11 and is held thereagainst by a locking nut 12 threaded onto the disk 11.

The disk 11 and its locking nut 12 are rigidly connected with a hollow shaft (outer shaft) 7 which is journaled for rotation relative to the inner or core shaft 3 and is provided, on its lower end, with a V-belt pulley 6. The latter is connected by the V-belts 6*a* to the drive pulley 19*a* of an electric motor 19. The latter is provided with a speed controller 19*b*.

As is also apparent from FIG. 1, the base 2 of the housing contains a bearing box 2*a* the bearings 2*b* of which rotatably receive the shaft 3. The latter has a ring 3*a* upon which the shaft 7 is rotatably supported.

For different rotating speeds or rotational senses for the core shaft 3 and the hollow shaft 7, the distributing cup 14 wobbles or nutates together with the centrifuge drum around the hollow shaft 7.

The centrifuge also includes a filling funnel 17 whose downwardly extending spout 17*a* opens into the distributing cup 14. The funnel 17 is mounted upon an outer centrifuge housing 18 provided with a liquid-collecting channel 18*a*. The lower portion of the housing has been represented at 21. This portion of the housing has a discharge hopper 21*a* through which the centrifugal material which travels downwardly along the interior of the drum 15 is discharged.

Surrounding the perforated basket portion of the drum, there is an upwardly diverging frustoconical shell 16 by which the liquid is conveyed upwardly and over the edge 16*a* into the channel 18*a*.

It will be apparent, therefore, that the nutating or wobble movement has a dual function. Firstly and principally it induces the material to be centrifuged to travel along the interior surface of the drum and to be discharged. In addition, it induces a flow of liquid over the edge 16*a* into the liquid collecting trough.

While the operation of the centrifuge is otherwise conventional, the nutating or wobble movement will be described in some detail. As indicated previously, the core shaft 3 and the centrifuge drum 15 connected therewith is operated at a different speed from that of the hollow shaft 7. In other words there is a speed differential $\Delta n$ between the speed $n_1$ of the core shaft 3 and the speed n of the hollow shaft 7. Thus $$\Delta n = n_1 - n_2. \quad (1)$$

While generally it has been thought to be desirable to maintain the differential speed $\Delta n$ small by comparison to $n_1$ and $n_2$, this does not allow the variation of the nutating or wobble angle in the manner of the present invention and requires the wobble angle to be determined exclusively by the angle of conicity $\gamma$ and the structuraly defined angle $\tau$. The latter is the angle between the vertical and the axis of shaft 9 in the rest position of the system as shown in FIG. 1.

Investigations of the movement kinetics of the nutating or wobble centrifuge have shown that it is possible to create an effective nutating or wobble angle $\tau'$ which is related to the structurally defined angle $\tau$ in accordance with the following relationship to a good approach $$\tau' = [1 - (1 - \frac{n_2}{n_1})]^2 \cdot \tau. \quad (2)$$

This formula follows the speed ranges in which the effect of the differential speed $\Delta n$ is particularly pronounced upon the nutating or wobble angle $\tau'$.

While the theory behind the ability to generate an effective wobble or nutating angle which differs materially from the structurally defined angle has not been fully developed, it appears that the phenomenon is due at least in part to the CORIOLIS effect upon the nutating or wobble angle.

For small differential speeds $\Delta n$, i.e. when $n_2/n_1$ is approximately equal to unity, the effective nutating angle $\tau'$ approaches or coincides with the structurally defined nutating angle $\tau$, usually 5 to 7°. As the difference between $n_2$ and $n_1$ increases, the effective nutating angle $\tau'$ deviates to a greater extend from the structurally defined angle $\tau$. When $n_2/n_1 = 2$, $\tau'$ equals 0, i.e. the nutating effect is eliminated.

By permitting adjustment of the speed of motor 19, the effective value of $\tau'$ can be varied within a wide range and, indeed, the transport effect can be brought to standstill, e.g. for interruption of the centrifugal operation.

With values of $n_2/n_1$ greater than 2 for the same sense of rotation or for rotation in opposite senses, the nutating angle $\tau'$ has negative values.

By varying the speed difference and either the speed $n_1$ or the speed n or both, it is possible to adjust the transport impulse and any particular material to be centrifuged and hence to modify the operation of the centrifuge, even during the running thereof, to increase or decrease the migration of material along the drum.

The system of the present invention eliminates the need for time-consuming reconstruction of the centrifuge to alter the structurally defined nutating angle. It also eliminates the need to store a wide variety of centrifuge drums with different angles of conicity.

Figure 2:
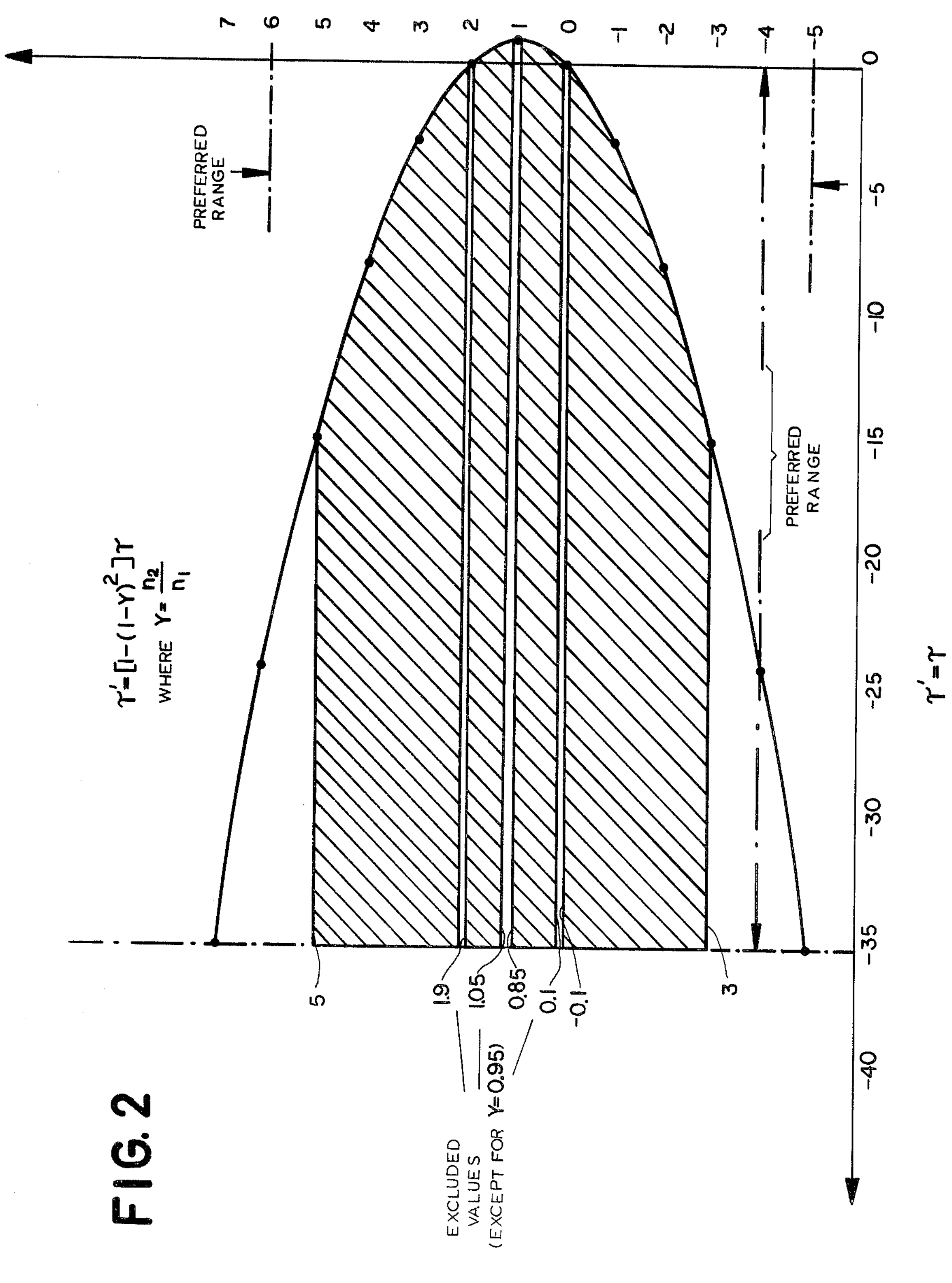
FIG. 2 is a graph showing the relationship between $X=\tau'/\tau$ with values of $Y=n_2/n_1$, respectively plotted along the abscissa and the ordinate.

In FIG. 2 there has been shown a graph of the permissible, preferred and excluded values with which the system may be operated. This graph is provided for illustrative purposes only. Note that X is plotted along the abscissa where $\tau' = X\tau$, while values of Y are plotted along the ordinate, Y being defined as $n_2/n_1$. Thus $$X = [1 - (1 - Y)^2]$$

Note that ranges within the parabola are operative except for the excluded ranges labeled in FIG. 2 with the exception that, where Y = 0.95 there is a discontinuity in the excluded values and hence this value of X is effective.

Note also that the preferred ranges have been designated by shading values of X less than −35 which are not particularly desirable.

Figure 3:
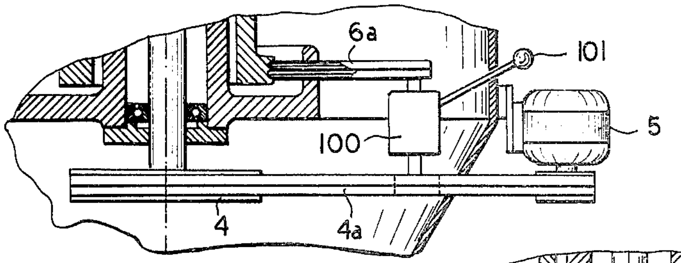
FIGS. 3 and 4 are fragmentary views similar to FIG. 1 but illustrating only portions thereof, to show other drive systems.

In FIG. 3 we have shown an arrangement in which the relative speeds of the two shafts is controlled by a variable speed transmission 100 connected between the belts 4*a* and the belts 6*a*.

The transmission 100 has a control 101 extending from the centrifuge housing and operable to vary the ratio $n_2/n_1$. Only a single drive motor 5 is necessary in this case.

Figure 4:
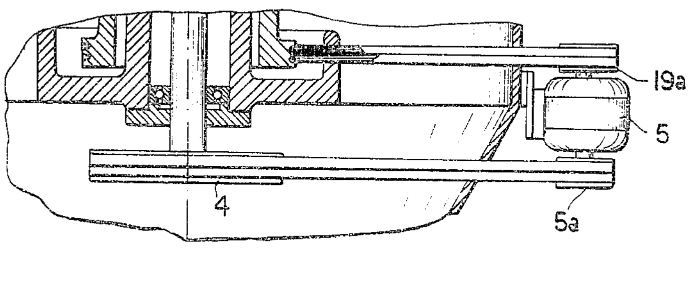

A single drive motor 5 is also provided in the embodiment of FIG. 4 although, in this case, the motor drives the sets of pulleys 5*a* and 19*a* which are replaceable to vary the speeds $n_2/n_1$.

We claim:

1. A method of operating a wobble or nutating centrifuge wherein a centrifuge drum is rotatable at a first speed $n_1$ and a tilt guide for the drum is rotatable at another speed $n_2$, said method comprising centrifugally filtering material in said drum by driving said drum and said guide at the respective speeds $n_1$ and $n_2$ while maintaining the ratio $n_2/n_1$ in one of the following ranges:

(a) 0.1 to 0.85
(b) at 0.95
(c) 1.05 to 1.9
(d) 2.1 to 5
(e) 0 to −5 thereby getting an effective nutating angle which differs from the structurally defined nutating angle $$\tau' = \left[1-(1-\frac{n_2}{n_1})^2\right] \cdot \tau.$$

2. The method defined in claim 1 wherein said ratio is varied during rotation of the drum and the centrifugation of said material.

* * * * *